Aug. 27, 1940.  T. F. PETERSON ET AL  2,212,700
ELECTRICAL CABLE
Filed Dec. 3, 1937
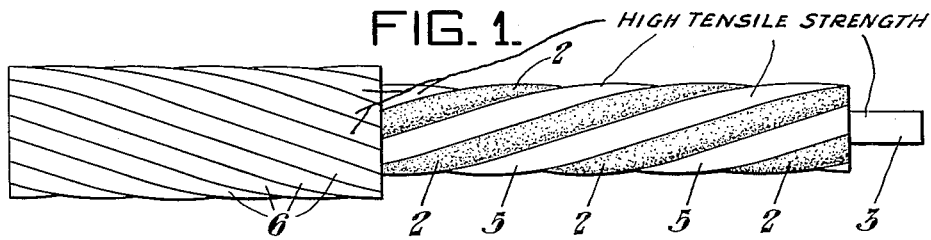
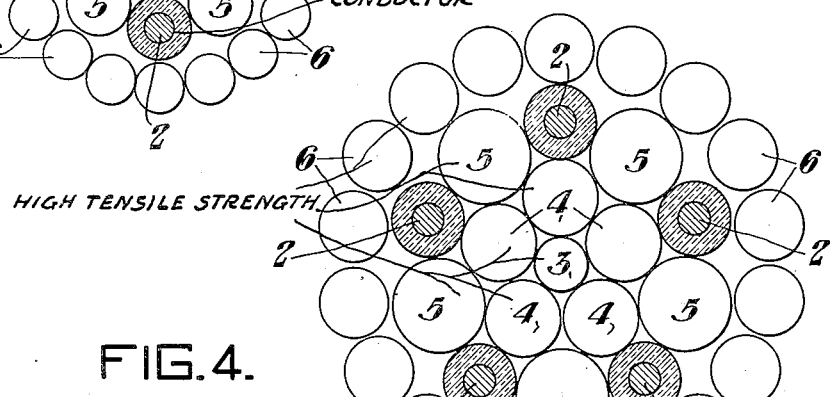
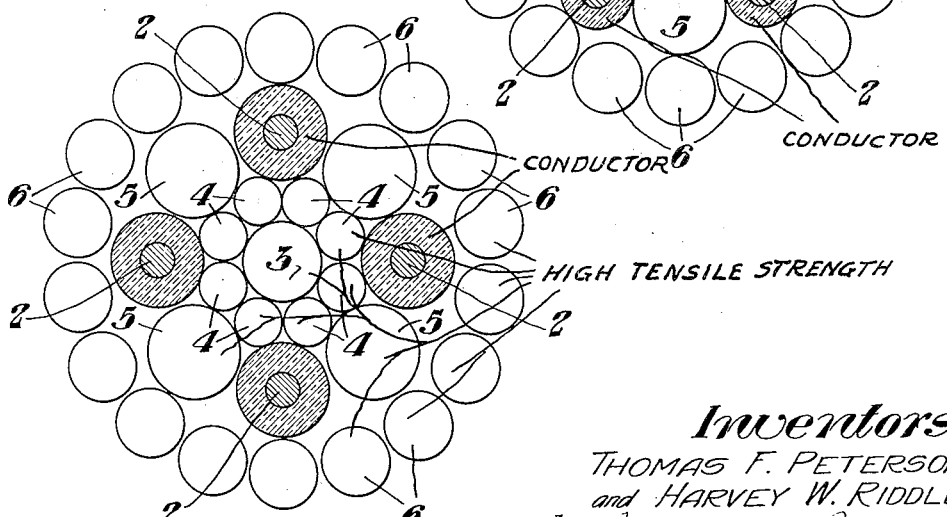
Inventors:
THOMAS F. PETERSON
and HARVEY W. RIDDLE.
by
their Attorneys.

Patented Aug. 27, 1940

2,212,700

UNITED STATES PATENT OFFICE 2,212,700

ELECTRICAL CABLE

Thomas F. Peterson and Harvey W. Riddle, Worcester, Mass., assignors to The American Steel and Wire Company of New Jersey, a corporation of New Jersey Application December 3, 1937, Serial No. 177,986

8 Claims. (Cl. 174—108)

This invention relates to cables and, more particularly, to an improved construction for wire cables containing insulated electrical conductors.

It is oftentimes desirable to provide in cables or ropes, such as are used to pull, hoist, suspend, or similarly transmit mechanical force, electrical conducting wires for transmitting electrical current from one connection to the other at the ends of the cable.

Cables of various constructions, carrying electrical conductors, have been used and suggested but all of them have certain disadvantages which limit their use. One type of cable construction which has been commonly used comprises an insulated electrical conducting single core-member covered by one or more layers or strands of helically wound metallic members of suitable tensile strength. Another type used so as to provide a plurality of electrical conductors consists of several complete cables of the above type, helically wound on a suitable fibrous or metallic conducting or non-conducting main core.

In most instances, cables of this construction were not satisfactory in that after the cables were in use for a while the insulating material on the electric conductors, being relatively soft, either became ruptured or squeezed away from between the central conductor and the metallic outer members which is, of course, very undesirable. This is caused by the natural compressive force exerted on the insulation of the core-member by the helically wound outer metallic members when the cable is under tension.

Another frequent cause of failure in such cables is that the central conductors are harmfully stretched by natural cable elongation under stress, and further, that the conductors, after being stretched, are often kinked or caused to "buckle" by recovery of the cable from elongation upon removal of stress. In these cables the helical members are, of course, supported by the layer of insulation on the core, which, being compressible, yields under pressure; allowing reduction in the diameter of the helices formed by the outer wires which results in elongation of the cable. Also, there is sometimes a slight untwisting of the wires of the cable which likewise results in considerable elongation. Elongation resulting from either of the above helical adjustments of the outer members occurs regardless of what elastic stretch may take place in the members themselves, and elongation resulting from helical adjustment is usually relatively large in comparison to that resulting from elastic stretch only. The conductor, being centrally placed and not disposed helically, can derive no corresponding elongation when helical adjustment of the outer members occurs. Consequently, the conductors can elongate only by stretching, which is very harmful to them and often ruptures them entirely. Thus, having been stretched beyond their elastic limit, the conductors cannot recover from elongation as the cable does, upon removal of stress. They are, therefore, caused to "buckle" or kink, and later this kinked portion of the conductor causes the insulation to fail at that point and allows the conductor to contact the outer wires.

It is an object of this invention to provide an electric cable having continuous longitudinally helical disposed spaces within the cross-section of the cable which are not subject to decrease in size by the natural compressive action of the metallic strands.

It is another object of this invention to provide an electrical conducting cable which is not subject to elongation or untwisting when in use.

It is a further object of this invention to provide a cable carrying insulated electrical conductors which are positioned and arranged so as not to be subject to excessive compressive forces.

Various other objects and advantages of our invention will more fully appear during the course of the following specification and will be more particularly pointed out in the appended claims.

In the accompanying drawing we have shown, for the purpose of illustration, one embodiment and several modifications thereof which our invention may assume in practice.

In the drawing:

Figure 1 is a fragmentary plan view of a short length of cable showing the position that the electrical wires or conductors assume in the improved cable of our invention;

Figure 2 is a cross-section of an electrical cable showing its construction and arrangement according to one form of our invention;

Figure 3 is a cross-section of an electrical cable showing its construction and arrangement according to a modified form of our invention; and Figure 4 is a cross-section of still another modification.

In Figures 2, 3 and 4 there are three different forms of cables shown, all made in accordance with this invention. In each of these views the numeral 2 denotes individually insulated strand members in which the conductor is either one solid unit or wire, or a stranded or bunched unit of wires of copper, steel, or some other suitable conducting material. Each of these conductors is enclosed in a covering of suitable electrical insulating material, such as rubber, synthetic resins, etc., to electrically insulate them from the other metallic strand members of the cable. The other members 3, 4, 5 and 6 are either single, solid or stranded units, all of relatively incompressible metallic, fibrous, or other suitable material. It is, of course, usually desirable that these members possess high tensile strength in order that the finished cable have considerable tensile strength.

Referring particularly to Figure 2, the cable shown has electrical conductors 2 and metallic strands 5 which together constitute an intermediate layer of wires which are helically wound in one direction about the core-member 3. The outer layer, consisting of wire strands 6, is preferably helically wound in the opposite direction about the intermediate layer, or otherwise wound so that the wire strands 6 of the outer layer are caused to cross over the members 2 and 5 in order to bridge the conductors 2 in the spaces between the metallic strands 5.

In Figure 3 the core-member 3 is relatively smaller than the core-member of the construction shown in Figure 2 and there is helically wound in one direction thereabout an inner layer of stranded metallic wires 4. The intermediate layer, consisting of electrical conductors 2 and metallic strands 5, is helically wound in the same direction about the inner layer wth the metallic strands 5 tracking between the strands 4 of the same. The outer layer, consisting of wires 6, is likewise helically wound in the opposite direction about the intermediate layer, as explained above.

In the cables illustrated by Figures 3 and 4, lateral shifting of the members 5 is prevented by the members 4. Tensional stresses applied during formation of the cable and greater ones applied during service cause each member of the cable to press toward the core 3. It is apparent that the members 5, resting in saddles formed by the members 4, are at all times prevented from shifting laterally, eliminating any lateral pressure on the insulated members 2.

Since the members 6 bridge the gaps between the members 5, pressure exerted by the members 6, or by objects contacting these members, is transmitted only to the members 5 and thence to the members 4 and 3. The cable illustrated in Figure 2 has no provision against lateral pressure, and this form is not preferred but may be used where lateral pressures will not be developed by ordinary service. In the forms shown in Figures 3 and 4, lateral pressures are prevented as explained above. It is apparent, therefore, that provision of these protected spaces prevent destruction of the insulating material by pressure, and further, because of the complete protection supplied, it is possible to use successfully the softer and less resistant insulating materials which may be preferred for their dielectric properties or for other desirable characteristics which they may have.

In certain cases it is desirable that the insulated conducting members be slightly larger than the spaces provided for them so as to develop some slight pressure on the insulated members. When rubber insulation is used this may be especially desired as it is believed that a slight compression impedes the penetration of oil, which is destructive. Also, a slight pressure on the insulated members is beneficial in preventing longitudinal shifting of that member by the friction developed between the members and the walls of the spaces. We do not deem it to be a departure from the spirit of this invention to thus provide for slight pressure on the insulated member when such is intended, as in that case no increase in this pressure is caused by conditions of service, because in the construction disclosed there is no tendency to reduce the size of the space provided for the conductor.

It is also not deemed a departure from the above principles to use, in certain cases, more than one layer of covering members, such as indicated by 6, or to eliminate the covering members entirely and build the cable with only the members 2, 3, 4 and 5, possibly, in this latter case, slightly reducing the conducting members 2 in diameter so as to derive greater protection from the adjacent members.

In the above we have dealt chiefly with those cables in which the spaces are provided for the purpose of containing and protecting insulated electrical conductors. We desire to be not necessarily limited to these uses for the spaces, however, as it may be desirable, in certain cases, to use these spaces for other purposes; for example, these spaces could be used to contain a reserve supply of material for lubricating and preserving the various members of the cable, or for containing fibrous wick-like lubricant-carrying material.

While we have, in this application, specifically shown and described several embodiments of our invention, it will be understood that this is merely for the purpose of illustration and description and that various other forms may be devised within the scope of our invention, as defined in the appended claims.

We claim:

1. A wire cable comprising a core, an inner layer of strands helically wound in one direction about said core, an intermediate layer of strands helically wound in the same direction about said inner layer, the strands in said intermediate layer being twice the number in said inner layer with the alternate strands tracking the strands thereof and with part of the strands in said intermediate layer being insulated electrical conductors, and an outer layer of strands helically wound in the opposite direction about said intermediate layer.

2. A wire cable comprising a core, an inner layer of strands helically wound in one direction about said core, an intermediate layer of strands helically wound in the same direction about said inner layer, the strands in the intermediate layer being equal in number to the strands in the inner layer and tracking the strands thereof and part of the strands of said intermediate layer being insulated electrical conductors, and an outer layer of strands helically wound in the opposite direction about said intermediate layer.

3. A wire cable comprising a core, a plurality of relatively non-compressible strands helically wound in one direction about said core, an intermediate layer of strands helically wound in the same direction about said inner layer, at least part of the strands of said intermediate layer having a relatively high tensile strength and hardness and tracking the strands of said inner layer and the remainder being insulated electrical conductors, and an outer layer of strands helically wound in the opposite direction about said intermediate layer, all of said layer of strands being so constructed and arranged as to prevent undue pressure or forces being transmitted to said electrical conductors.

4. A wire cable comprising a core, a plurality of strands helically wound about said core in two concentric layers of the same pitch or lay, whereby the strands of each lay track with each other, part of said strands having a high tensile strength and hardness and part of said strands being insulated electrical conductors, and an outer layer of strands wound helically in the opposite direction about said two layers, said high tensile strength strands being so constructed and arranged as to absorb substantially all of the pressure or force that might be exerted on the cable so as to prevent any great amount of pressure or force being transmitted to the electrical conductors.

5. A wire cable comprises a core, an inner layer of strands consisting of a plurality of relatively non-compressible strands helically wound in one direction about said core, an intermediate layer of strands helically wound in the same direction about said inner layer, the alternate strands of said intermediate layer being metallic wire strands having a relatively high tensile strength and hardness which track the strands of said inner layer and arranged so as to provide longitudinally continuously extending spaces therebetween, an insulated electrical conductor disposed in each of said spaces, and an outer layer of strands helically wound in the opposite direction about said intermediate layer so as to bridge said spaces and the electrical conductors arranged therein.

6. A wire cable comprising a non-compressible wire core, an intermediate layer of strands helically wound in one direction about said core with the alternate strands of said intermediate layer being relatively non-compressible and the other of said strands being insulated electrical conductors, said core holding the non-compressible strands in a fixed position relative to each other to prevent circumferential shifting thereof, and an outer layer of non-compressible strands helically wound in the opposite direction about said intermediate layer so as to bridge over the insulated electrical conductors of the intermediate layer positioned between the non-compressible strands thereof.

7. A wire cable comprising a non-compressible wire core, an intermediate layer of strands helically wound in one direction about the said core and tracking the same with the alternate strands of said intermediate layer being relatively non-compressible and each of the other of said strands being insulated conducting members, said core holding the non-compressible strands in a fixed position relative to each other so as to prevent circumferential shifting thereof, and an outer layer of non-compressible strands helically wound in the opposite direction about said intermediate layers so as to bridge over the conducting members of the intermediate layer positioned between the non-compressible strands thereof.

8. A wire cable comprising a non-compressible wire core, an intermediate layer of strands helically wound in one direction about said core and tracking the same with at least part of the strands of said intermediate layer being relatively non-compressible and spaced apart from each other so as to provide longitudinally continuously extending spaces therebetween, conducting means disposed in at least one of said spaces, said core holding the non-compressible strands in a fixed position relative to each other so as to prevent circumferential shifting thereof, and an outer layer of non-compressible strands helically wound in the opposite direction about said intermediate layer so as to bridge over the spaces between the non-compressible strands thereof.

THOMAS F. PETERSON.
HARVEY W. RIDDLE.